United States Patent Office 3,304,853
Patented Feb. 21, 1967

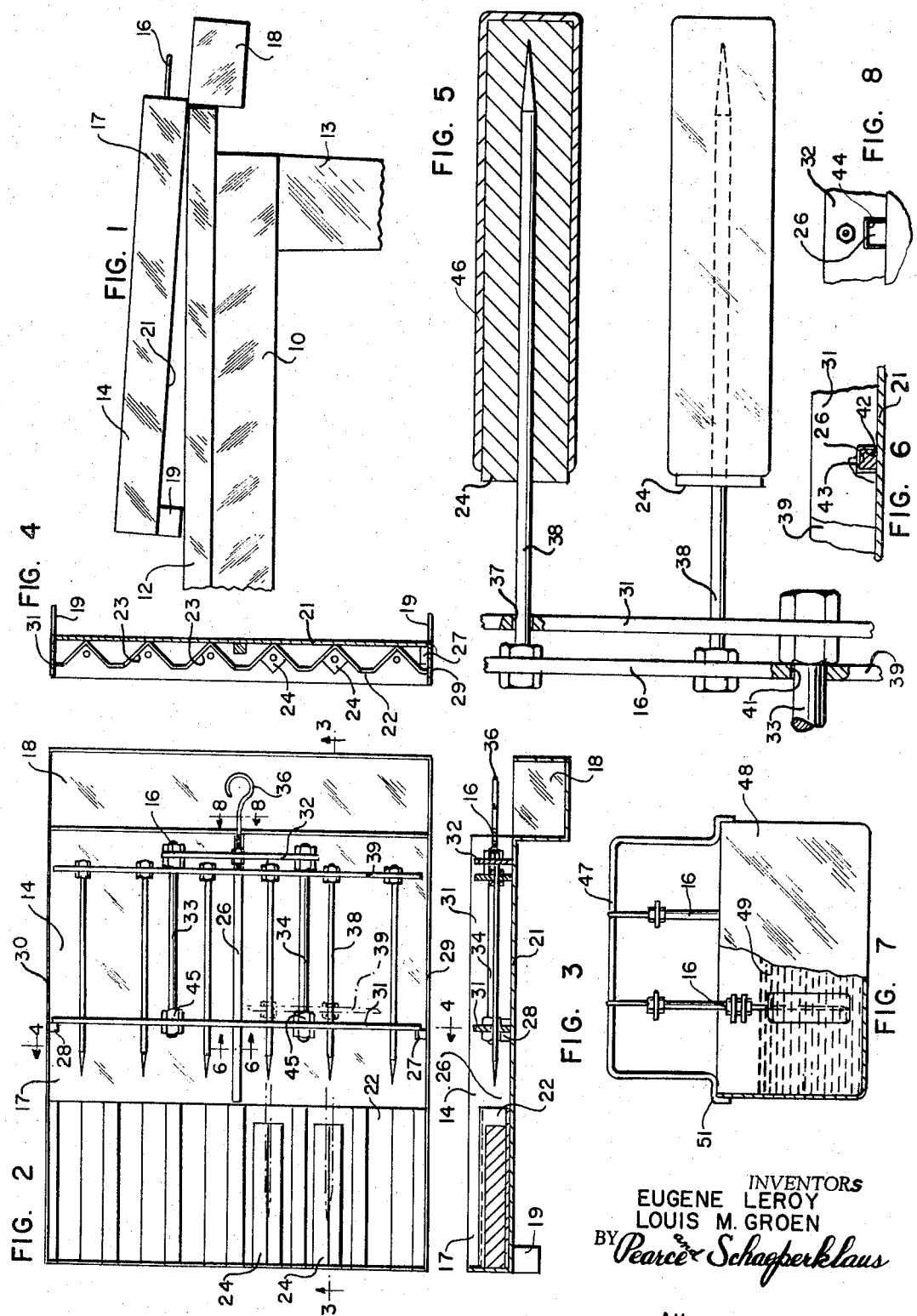

3,304,853
FOOD PREPARING APPARATUS
Eugene Le Roy, Green Township, Hamilton County, Ohio
(2922 Blue Rock Road, Cincinnati, Ohio 45239), and
Louis M. Groen, Green Township, Hamilton County,
Ohio (6034 Countryhills Drive, Cincinnati, Ohio
45238
Filed Dec. 11, 1963, Ser. No. 329,789
4 Claims. (Cl. 99—421)

This invention relates to cooking devices. More particularly, this invention relates to devices for cooking blocks of solid food products in deep fat or the like.

An object of this invention is to provide a device having a plurality of prongs or spikes on which blocks of food can be impaled during cooking.

A further object of this invention is to provide a holder for blocks of food which positions the blocks so that the spikes can be directed substantially axially of the blocks as the spikes are inserted into the blocks.

A further object of this invention is to provide means for guiding the spikes as the spikes are inserted into the blocks so that the spikes extend substantially axially of the blocks.

A further object of this invention is to provide means for supporting the spikes with the food blocks extending into a container of heated fat or the like for cooking the food blocks.

The above and other objects and features of the invention will be apparent to those skilled in the art to which this invention pertains, from the following detailed description and the drawing, in which:

FIG. 1 is a view in side elevation of a food holder and spiked food carrier constructed in accordance with an embodiment of this invention, the holder and carrier being shown supported on a fragmentary portion of a table;

FIG. 2 is a plan view of the holder and carrier;

FIG. 3 is a view in section taken on the line 3—3 in FIG. 2;

FIG. 4 is a view in section taken on the line 4—4 in FIG. 2;

FIG. 5 is an enlarged fragmentary view partly in section and partly in elevation showing a fragmentary portion of the carrier with blocks of food mounted thereon;

FIG. 6 is a view in section taken on the line 6—6 in FIG. 2;

FIG. 7 is a view on a reduced scale showing a pan of fat in combination with a pair of carriers and a rod and rod supports for holding the carriers; and FIG. 8 is a view in section taken on the line 8—8 in FIG. 2.

In the following detailed description and the drawings, like reference characters indicate like parts.

In FIG. 1 is shown a fragmentary portion of a table 10 having a horizontal upper face 12 and legs 13, only one of which is shown. On the table is mounted a holder 14 and a spiked carrier 16 constructed in accordance with an embodiment of the invention.

As shown in FIGS. 2 and 3, the holder 14 includes a main portion 17 and a drip pan 18 at one end thereof. Legs 19 (FIGS. 3 and 4) support the holder on the table with a bottom 21 of the main portion sloping downwardly toward the drip pan 18, as shown in FIG. 1, and any liquid that collects in the holder flows downwardly into the drip pan 18. At the opposite end of the main portion is mounted a rack 22 which, as shown in FIG. 4, includes a plurality of equally spaced, V-shaped troughs 23 in which rectangular blocks 24 of food, such as blocks of fish or the like, are placed so that the food blocks are equally spaced and parallel, as shown in FIG. 2. On the main portion of the holder is mounted a guide bar 26. which is parallel to the troughs 23. Stops 27 and 28 are mounted on side walls 29 and 30 of the main portion. The guide bar 26 and the stops 27 and 28 cooperate with the spiked food carrier 16.

Details of construction of the food carrier are shown in FIGS. 2 and 3. The carrier 16 includes a main frame which includes two parallel bars 31 and 32 which are linked by rods 33 and 34. A hook-shaped handle 36 is attached to the bar 31. The bar 31 is provided with a plurality of perforations 37 (FIG. 5) in which spikes 38 are slideably mounted. Heads of the spikes are attached to a bar 39. The bar 39 is provided with bores 41 (FIG. 5), only one of which is shown, through which the rods 33 and 34 extend so that the assembly of spikes 38 and bar 39 can reciprocate with respect to the main frame from the position shown in FIG. 3 to that shown in FIGS. 5 and 7. The bars 31 and 39 are provided with slots 42 and 43, respectively, as shown in FIG. 6, which cooperate with the guide bar 26 to hold the spikes in alignment with the V-grooves 23 so that, when the spikes are advanced from the FIG. 2 position, leftwards, the spikes impale the food blocks 24 and the stops 27 and 28 restrain movement of the main frame when the spikes are extended with nuts 45 on the bars 33 and 34 being engaged by the bar 39, as indicated in dot-dash lines in FIG. 2 to stop the spikes when the spikes extend into the blocks 24 a predetermined distance. The bar 32 (FIG. 8) is provided with a similar slot 44 which cooperates with the guide bar 26.

When the food blocks 24 have been impaled on the spikes 38, the food blocks are dipped in an appropriate batter to provide a batter coating 46 (FIG. 5). The batter substantially covers the food block but preferably does not extend to the spikes. The carrier 16 is then hung on a rod 47 overlying a pot 48 in which heated fat 49 surrounds the batter-coated food blocks to cook the food blocks. The rod 47 is supported by brackets 51 which rest on end walls of the pot 48. When the food blocks have been cooked, the carriers are removed from the fat and the food blocks are stripped from the spikes.

The carrier and food holder construction illustrated in the drawing and described above is subject to structural modification without departing from the spirit and scope of the appended claims.

Having described our invention, what we claim as new and desire to secure by Letters Patent is:

1. In combination, a food carrier comprising a main frame, a plurality of spaced parallel elongated spikes mounted for reciprocation on said main frame axially thereof, and means for connecting the spikes to reciprocate in unison, and a food holder comprising a body, a rack mounted on the body, said rack having a plurality of parallel elongated pockets for holding a plurality of food blocks in parallelism, and means on the body engageable with the carrier to guide the spikes of reciprocation lengthwise of the blocks in the pockets to impale the blocks on the spikes, and means on the main frame for hanging the carrier with blocks on the spikes in heated liquid to cook the blocks.

2. In combination, a food carrier comprising a main frame, a plurality of spaced parallel elongated spikes mounted for reciprocation on said main frame axially thereof, and a bar connecting the spikes to reciprocate in unison, and a food holder comprising a body, a rack mounted on the body, said rack having a plurality of parallel elongated pockets for holding a plurality of food blocks in parallelism, a guide on the body extending parallel to the pockets engageable with the bar to guide the bar and the spikes for reciprocation lengthwise of the blocks in the pockets to impale the blocks on the spikes, and means on the body engageable with the frame for holding the main frame in position to stop the spikes when the spikes have entered the blocks to a predetermined depth, and means on the main frame for hanging the carrier with blocks on the spikes in heated liquid to cook the blocks.

3. In combination, a food carrier comprising a main frame, a plurality of spaced parallel elongated spikes mounted for reciprocation on said main frame axially thereof, and means for connecting the spikes to reciprocate in unison, and a food holder comprising a body, a rack mounted on the body at one end portion thereof, a drip pan mounted at an opposite end portion thereof, said rack having a plurality of parallel elongated pockets for holding a plurality of food blocks in parallelism, means on the body engageable with the carrier to guide the spikes for reciprocation lengthwise of the blocks in the pockets to impale the blocks on the spikes, means for mounting the food holder with the body sloping downwardly of the rack to the drip pan, whereby liquid in the food holder collects in the drip pan, and means on the main frame for hanging the carrier with blocks on the spikes in heated liquid to cook the blocks.

4. In combination, a food carrier comprising a main frame, a plurality of spaced parallel elongated spikes mounted for reciprocation on said main frame axially thereof, and means for connecting the spikes to reciprocate in unison, and a food holder comprising a body, a rack mounted on the body, said rack having a plurality of parallel elongated pockets for holding a plurality of food blocks in parallelism, and means on the body engageable with the carrier to guide the spikes for reciprocation lengthwise of the blocks in the pockets to impale the blocks on the spikes.

References Cited by the Examiner

FOREIGN PATENTS 135,321   11/1949   Australia.
438,252   3/1912   France.

WILLIAM I. PRICE, *Primary Examiner.*